Figure 1:
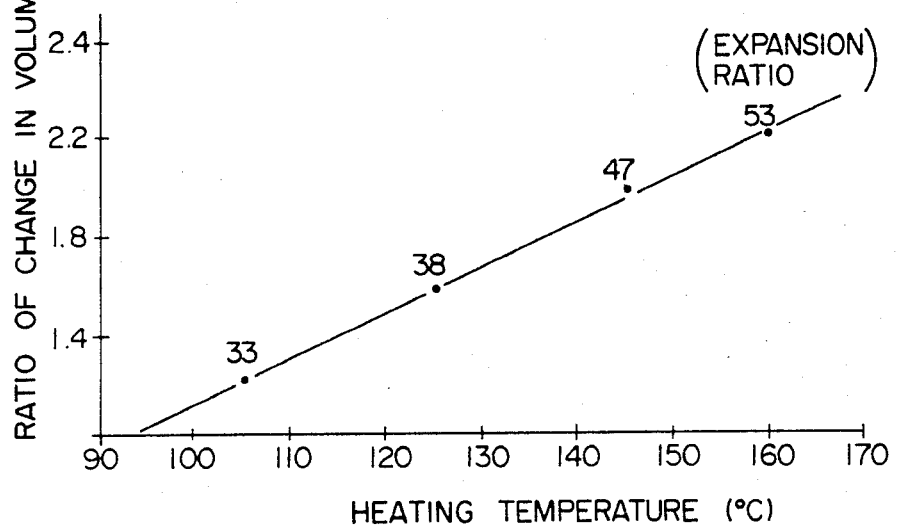

United States Patent [19]

Kuwabara et al.

[11] Patent Number: 4,504,601

[45] Date of Patent: Mar. 12, 1985

[54] PROCESS FOR PRODUCING PRE-FOAMED PARTICLES OF POLYPROPYLENE RESIN

[75] Inventors: Hideki Kuwabara, Hatano; Shohei Yoshimura, Tomioka; Toru Yamaguchi, Hiratsuka; Yoshimi Sudo, Fujisawa, all of Japan

[73] Assignee: Japan Styrene Paper Corporation, Tokyo, Japan

[21] Appl. No.: 536,847

[22] Filed: Sep. 29, 1983

[30] Foreign Application Priority Data

Oct. 1, 1982 [JP] Japan .................. 57-172590
Jan. 20, 1983 [JP] Japan .................. 58-7743

[51] Int. Cl.$^3$ .............................. C08J 9/22
[52] U.S. Cl. ...................... 521/58; 264/53; 264/DIG. 9; 521/56; 521/60; 521/143; 521/144
[58] Field of Search .......... 521/59, 56, 60, 58; 264/DIG. 9, 53

[56] References Cited

U.S. PATENT DOCUMENTS

| | | | |
|---|---|---|---|
| 3,709,806 | 1/1973 | Minami et al. | 521/60 |
| 3,743,611 | 7/1973 | Muroi et al. | 521/60 |
| 3,770,663 | 11/1973 | Ueki et al. | 521/60 |
| 3,823,213 | 7/1974 | Stastny et al. | 521/56 |
| 4,168,353 | 9/1979 | Kitamori | 521/139 |
| 4,303,756 | 12/1981 | Kajimura et al. | 521/139 |
| 4,379,859 | 4/1983 | Hirosawa et al. | 521/56 |
| 4,399,087 | 8/1983 | Akiyama et al. | 521/56 |
| 4,415,680 | 11/1983 | Ushirokawa et al. | 521/56 |
| 4,429,059 | 1/1984 | Ozutsumi et al. | 521/60 |

Primary Examiner—Morton Foelak
Attorney, Agent, or Firm—Sherman & Shalloway

[57] ABSTRACT

A process for producing pre-foamed particles of a polypropylene resin which comprises expanding original pre-foamed particles of a polypropylene resin, said original pre-foamed particles having the following relation $$2 < E^{\frac{1}{3}} \times n^{\frac{1}{2}} < 45$$

wherein E is the expansion ratio of the original pre-foamed particles, and n is the number of cells per mm$^2$ of the cross section of the original pre-foamed particles, by (1) imparting expanding ability to the original pre-foamed particles and then heating them with a heated gas to the heat distortion temperature of the base resin of the pre-foamed particles or a higher temperature or (2) heating the original pre-foamed particles with steam to the heat distortion temperature of the base resin of the particles or a higher temperature with or without imparting expanding ability thereto, whereby pre-foamed particles having an expansion ratio higher than the original expansion ratio E are obtained.

9 Claims, 2 Drawing Figures

PROCESS FOR PRODUCING PRE-FOAMED PARTICLES OF POLYPROPYLENE RESIN

This invention relates to a process for producing pre-foamed particles of a polypropylene resin. More specifically, this invention relates to a process for producing pre-foamed particles of a polypropylene resin having good moldability.

Foamed polystyrene and foamed polyethylene have long been used widely as cushioning materials, packaging materials, etc. Recently, foams of polypropylene-type resins have also come into use. The present applicant already filed a patent application for a process of obtaining pre-foamed particles used in the bead molding of polypropylene-type resins (Japanese Patent Publication No. 1344/1981). This process is innovative in that pre-foamed particles of a relatively high expansion ratio can be obtained by a simple procedure from polypropylene resin particles which are considered to be very difficult to foam. It, however, has the following problems, and is still desired to be improved.

(1) Although pre-foamed particles of a relatively high expansion ratio can be obtained, their expansion ratio is about 25 at the highest. If an attempt is made to obtain higher expansion ratios, the proportion of closed cells in the product decreases and the product cannot be submitted to molding.

(2) The resulting pre-foamed particles tend to have minute cells. With such pre-foamed particles, it is difficult to obtain foamed articles having good dimensional accuracy and high stiffness.

An object of this invention is to provide a process which can produce pre-foamed particles of a polypropylene resin having a high expansion ratio of, for example, about 30 to 100 and yet a large proportion of closed cells by a simple procedure.

Another object of this invention is to provide a process for easily producing pre-foamed particles of a polypropylene resin which, whether of a low or high expansion ratio, have good moldability and can give molded articles having high stiffness and good dimensional accuracy.

The present inventors have made extensive investigations in order to achieve the above objects. These investigations have led to the discovery that pre-foamed particles having an increased expansion ratio and an increased cell diameter (a decreased number of cells) can be obtained by heating original pre-foamed particles of a polypropylene resin having a specified relation between the expansion ratio and the number of cells to the heat distortion temperature of the base resin of these particles or a higher temperature either (1) with a heated gas after imparting expanding ability thereto, or (2) with steam with or without imparting expanding ability thereto, and that these pre-foamed particles have excellent moldability and give foamed articles having good dimensional accuracy and high stiffness.

According to this invention, there is provided a process for producing pre-foamed particles of a polypropylene resin, which comprises expanding original pre-foamed particles of a polypropylene resin, said original pre-foamed particles having the following relation $$2 < E^{\frac{1}{3}} \times n^{\frac{1}{2}} < 45$$

wherein E is the expansion ratio of the original pre-foamed particles, and n is the number of cells per mm² of the cross section of the original pre-foamed particles, by (1) imparting expanding ability to the original pre-foamed particles and then heating them with a heated gas to the heat distortion temperature of the base resin of the pre-foamed particles or a higher temperature or (2) heating the original pre-foamed particles with steam to the heat distortion temperature of the base resin of the particles or a higher temperature with or without imparting expanding ability thereto, whereby pre-foamed particles having an expansion ratio higher than the original expansion ratio E are obtained.

Examples of the polypropylene resin used in this invention include a homopolymer of propylene, an ethylene-propylene random copolymer, an ethylene-propylene block copolymer, and mixtures of these. The ethylene-propylene random copolymer is particularly preferred.

The original pre-foamed particles of the polypropylene resin used in the foaming process of the invention are pre-foamed particles having the following relation $$2 < E^{\frac{1}{3}} \times n^{\frac{1}{2}} < 45$$

wherein E is the expansion ratio of the original pre-foamed particles, and n is the number of cells per mm² of the cross section of the original pre-foamed particles.

If $E^{\frac{1}{3}} \times n^{\frac{1}{2}}$ is 2 or less, pre-foamed particles obtained by heat-expanding the original pre-foamed particles have too large cells, and foamed articles having good properties cannot be obtained from them.

When $E^{\frac{1}{3}} \times n^{\frac{1}{2}}$ is 45 or more (namely, when the expansion ratio E is extremely high, and/or the number n of cells is extremely large), shrinkage is liable to occur in these pre-foamed particles during heat-expanding, and the foaming efficiency becomes very poor. If expanding is effected forcibly, the ratio of closed cells in the product will be decreased. Foamed articles obtained by using these pre-foamed particles have poor dimensional accuracy and unsatisfactory properties.

The original pre-foamed particles to be expanded by the process of this invention can be obtained, for example, by feeding polypropylene resin particles, a volatile blowing agent and a dispersing medium into a closed vessel, heating them to a temperature above a point at which the resin particles soften, thereafter opening one end of the vessel, and releasing the resin particles and the dispersing medium simultaneously into an atmosphere kept at a lower pressure than the inside of the vessel.

According to a first embodiment, i.e. the process (1), expanding ability is first imparted to the original pre-foamed particles. This can be achieved by including an inorganic gas, a volatile blowing agent, or a mixture of these into the pre-foamed particles so that the internal pressure usually reaches 1.5 to 10 kg/cm² (abs.) although this differs depending upon the desired expansion ratio. Air, nitrogen, argon, helium, carbon dioxide, etc. can be cited as the inorganic gas. Usually, air is employed. Examples of the volatile blowing agent include aliphatic hydrocarbons such as propane, butane, pentane and hexane; alicyclic hydrocarbons such as cyclobutane and cyclopentane; and halogenated hydrocarbons such as trichlorofluoromethane, dichlorodifluoromethane, dichlorotetrafluoroethane, methyl chloride, ethyl chloride and methylene chloride.

The original pre-foamed particles to which expanding ability has been imparted as above are then heated with a heated gas to the heat distortion temperature of the base resin of the particles or a higher temperature. When the heating temperature is below the heat distortion temperature, the diameter of the resulting cells does not become large, and an increase in expansion ratio is difficult to obtain. The upper limit of the heating temperature is the highest of temperatures at which the original pre-foamed particles can be expanded well without melt adhesion. Usually, it is a temperature about 15° C. higher than the melting point of the particles. There is no particular limitation on the heating time. Generally, it is not more than 8 minutes, preferably not more than 7 minutes.

In the process (1) described above, the expanding operation is not limited to one operation. If desired, after one expanding operation, the pre-foamed particles may again be subjected to a procedure of imparting expanding ability to them and expanding them by heating with a heated gas. Such an operation may be repeated any desired number of times so long as the original pre-foamed polypropylene resin particles satisfy the relation $2 < E^{\frac{1}{3}} \times n^{\frac{1}{4}} < 45$. In the process (1) described above there may be used air, nitrogen, argon, helium, carbon dioxide, dichlorodifluoromethane, trichlorofluoromethane, dichlorotetrafluoroethane etc. as the gas. Usually, air is preferably used.

In a second embodiment of this invention, i.e. the process (2), the original pre-foamed particles of the polypropylene resin are heated with steam to the heat distortion temperature of the base resin of the particles or a higher temperature with or without imparting expanding ability thereto in advance.

In the process (2), the operation of imparting expanding ability to the original pre-foamed particles is not essential. However, when the original pre-foamed particles are to be expanded to a ratio of at least 1.4 or the original pre-foamed particles have an expansion ratio of not more than 10, highly expanded foamed particles cannot be obtained by one expanding operation, and therefore expanding ability is preferably imparted to them beforehand.

Heating in the process (2) for expanding is carried out by feeding into a vessel original pre-foamed particles, to which expanding ability has been, or has not been, imparted, and introducing steam directly into the vessel with stirring. For example, steam having a pressure of 0.5 to 3 kg/cm²(G) is usually employed as the steam. The heating time is usually not more than 1 minute, preferably not more than 30 seconds. Use of steam makes it possible to perform heating within a shorter period of time than in the case of using a heated gas. Consequently, the productivity increases.

The operation in the process (2) is not limited to one operation. Pre-foamed particles obtained by one heat-expanding may again be subjected to a procedure of heating them with steam with or without imparting expanding ability. Such an operation may be repeated any desired number of times so long as the original pre-foamed particles of the polypropylene resin to be expanded satisfy the above-specified relation.

It is even possible to heat-expand the pre-foamed particles once by the process (1) and then again heat-expand them by the process (2), or to heat-expand them once by the process (2) and then again heat-expand them by the process (1), or to use a combination of the process (1) and the process (2) in any other sequences.

The heat distortion temperature, as used herein, is measured at a stress of 4.6 kg/cm² in accordance with ASTM D-648. The polypropylene resins used in this invention preferably have a heat distortion temperature of 80° to 130° C.

The expansion ratio E in this invention denotes a true expansion ratio. The true expansion ratio is a reciprocal of the quotient of the density of the original pre-foamed particles divided by the density of the base resin. The density of the original pre-foamed particles can be determined, for example, by putting the pre-foamed particles of a known weight into a predetermined amount of water previously added to a measuring cylinder, measuring the entire volume of the contents of the measuring cylinder, subtracting the volume of water originally present from the entire volume to obtain the volume of the pre-foamed particles, and dividing their weight by their volume.

The expansion ratio of pre-foamed particles obtained by this invention is usually at least 1.15 times, for example 3 to 100 times, preferably 10 to 60 times, the expansion ratio of the original pre-foamed particles, and these pre-foamed particles contain 0.1 to 200 cells per mm².

The pre-foamed particles obtained by this invention are used for the production of foamed molded articles. The pre-foamed particles are first aged for a predetermined period of time at room temperature and atmospheric pressure, and then further aged for a predetermined period of time under a predetermined pressure using an inorganic gas such as nitrogen or air, or a mixture of an inorganic gas and a volatile blowing agent. The pre-foamed particles to which an internal pressure has been imparted by the pressurized aging are then filled, for example, in a mold having on its surface small holes through which a heated medium such as steam can pass, and heated, for example, with steam under a pressure of 2 to 5 kg/cm² (G). As a result, a foamed article conforming to the mold is obtained.

Foamed articles of polypropylene resins obtained by using the pre-foamed particles produced by the process of this invention can be used in a variety of applications, for example as packaging materials, cushioning materials, heat insulating materials, building materials, vehicle parts, floating materials, foodstuff containers, etc.

As stated hereinabove, pre-foamed particles of a polypropylene resin having a high expansion ratio and a lesser number of cells per mm² of their cross section can be obtained. Foamed articles produced from these pre-foamed particles have good dimensional accuracy, good melt-adhesion between the particles, high flexibility, etc.

The following Examples and Comparative Examples specifically illustrate the present invention.

Figure 2:
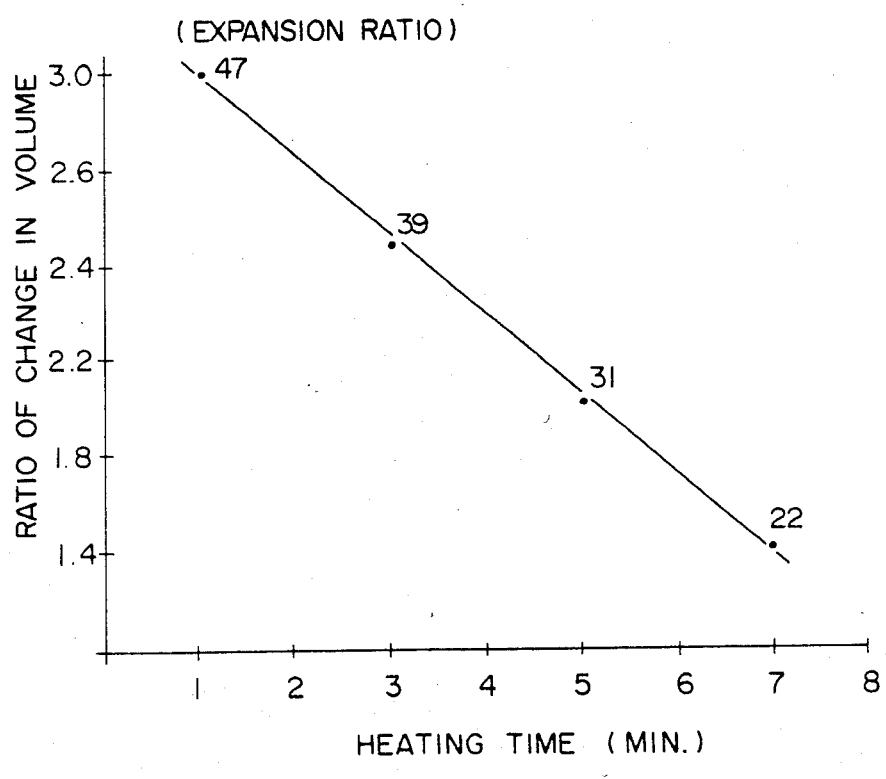

The accompanying drawings are graphs for illustrating the Examples in detail. FIG. 1 shows the relation between the ratio of change in volume and the heating temperature in Example 2, and FIG. 2 shows the relation between the ratio of change in volume and the heating time in Example 3.

EXAMPLE 1

An internal pressure of 2.20 kg/cm² (abs.) was imparted by air to original pre-foamed particles of an ethylene-propylene random copolymer (melting point 145° C.; heat distortion temperature 95° C.) having an expansion ratio (E) of 16 and each of the number (n) of cells shown in Table 1 which had been obtained by a conventional method. The particles were then maintained in a hot air oven at 145° C. for 1 minute. The original pre-foamed particles to which expanding ability was thus imparted were aged for 2 days with air under a pressure of 3 kg/cm² (abs.). Then, the particles were filled in a mold, and heated with steam under 3.2 kg/cm² (G) to obtain a foamed article. The dimensional accuracy and the melt-adhesion of the foamed article were measured, and the results are shown in Table 1.

COMPARATIVE EXAMPLE 1

Foamed articles were obtained by repeating Example 1 except that original pre-foamed particles having the numbers of cells shown in Table 1 were used. The results are shown in Table 1.

ratio 24; the number of cells 40 per mm²; $E^{\frac{1}{3}} \times n^{\frac{1}{2}} = 15.6$) of an ethylene-propylene random copolymer (melting point 145° C., heat distortion temperature 95° C.). The original pre-foamed particles to which expanding ability was imparted were maintained in a hot air oven for 1 minute at each of the temperatures shown in Table 2, and then treated in the same way as in Example 1 to obtain a foamed article. The results are shown in Table 2.

For comparison, a foamed article was produced in the same way as above except that the temperature of the hot air oven was changed to 90° C. The results are shown in Table 2. The relation between the heating temperature and the ratio of change in the volume of the pre-foamed particles was shown in FIG. 1.

TABLE 1

| | Original pre-foamed particles | | Pre-foamed particles after treatment | | | Foamed article | | |
|---|---|---|---|---|---|---|---|---|
| | Number of cells per mm² | $E^{\frac{1}{3}} \times n^{\frac{1}{2}}$ | Number of cells per mm² | Expansion ratio | Expansion ratio | Dimensional accuracy (*1) | Melt adhesion (*2) | Overall evaluation |
| Example 1 | | | | | | | | |
| a | 1.4 | 3 | 1 | 27 | 43 | | | |
| b | 31 | 14 | 19 | 32 | 51 | | | |
| c | 252 | 40 | 170 | 29 | 46 | | | |
| Comparative Example 1 | | | | | | | | |
| a | 0.2 | 1.5 | 0.29 | 22 | 34 | X | X | |
| b | 567 | 60 | 489 | 25 | 38 | Δ | Δ | |
| c | 1010 | 105 | 1500 | 20 | 28 | X | X | |

(*1): The dimensional accuracy was evaluated by the shrinkage of the foamed molded article on the following scale.
    1 to less than 3%:
    3 to less than 4%:     Δ
    4% or more:     X
(*2): The adhesion was determined as follows:-A test sample, 150 mm long, 50 mm wide and 10 mm thick, was pulled by a Tensilon tester at a rate of 500 mm/min. until fracture occurred. The melt adhesion of the sample was evaluated by the state of its cross section on the following scale.
    Material destroyed:
    Material destroyed and     Δ
    breakage occurred between
    the particles:
    Breakage occurred between     X
    the particles:

EXAMPLE 2 AND COMPARATIVE EXAMPLE 2

An internal pressure of 2.4 kg/cm² (abs.) was imparted by air to original pre-foamed particles (expansion

TABLE 2

| | Pre-foamed particles after treatment | | | | Foamed article | | | |
|---|---|---|---|---|---|---|---|---|
| | Temperature of the hot air oven (°C.) | Expansion ratio | Number of cells per mm² | State of the particles | Expansion ratio | Dimensional accuracy (*1) | Melt adhesion (*2) | Overall evaluation |
| Example 2 | | | | | | | | |
| a | 105 | 33 | 24 | Surface lustrous, no melt-adhesion. | 52 | | | |
| b | 125 | 38 | 21 | Surface lustrous, no melt-adhesion. | 60 | | | |
| c | 145 | 47 | 19 | Surface lustrous, no melt-adhesion. | 75 | | | |
| d | 160 | 53 | 17 | Surface lustrous, some melt-adhesion occurred. | 84 | | | |
| Compara- | 90 | 24 | 40 | No change | — | — | — | — |

TABLE 2-continued

| | Pre-foamed particles after treatment | | | | Foamed article | | | |
|---|---|---|---|---|---|---|---|---|
| | Temperature of the hot air oven (°C.) | Expansion ratio | Number of cells per mm² | State of the particles | Expansion ratio | Dimensional accuracy (*1) | Melt adhesion (*2) | Overall evaluation |
| tive Ex. 2 | | | | from the original pre-foamed particles. | | | | |

(*1) and (*2): Same as the footnote to Table 1.

EXAMPLE 3

An internal pressure of 3.5 kg/cm²(abs.) was imparted by air to original pre-foamed particles (expansion ratio 16; the number of cells 60 per mm²; $E^{\frac{1}{3}} \times n^{\frac{1}{2}} = 19.5$) of an ethylene-propylene random copolymer (melting point 145° C., heat distortion temperature 95° C.). Then, these particles were maintained in a hot air oven at 150° C. for each of the time periods shown in Table 3. An internal pressure of 1.8 to 2.2 kg/cm² (abs.) was imparted by air to the pre-foamed particles, and the particles were filled in a mold. They were heated with steam under 3.2 kg/cm² (G) to obtain a foamed article. The results are shown in Table 3.

The relation between the heating time and the ratio of change in the volume of the pre-foamed particles is shown in FIG. 2.

EXAMPLE 4

Three types of original pre-foamed particles A, B and C having different expansion ratios and different numbers of cells (A: expansion ratio 11, the number of cells 40 per mm², $E^{\frac{1}{3}} \times n^{\frac{1}{2}} = 14.1$; B: expansion ratio 16, the number of cells 60 per mm², $E^{\frac{1}{3}} \times n^{\frac{1}{2}} = 19.5$; C: expansion ratio 24, the number of cells 80 per mm², $E^{\frac{1}{3}} \times n^{\frac{1}{2}} = 25.8$) of an ethylene-propylene random copolymer were given each of the internal pressures shown in Table 4, and maintained in a hot air oven at 145° C. for 1 minute. Then, an internal pressure of 1.8 to 2.5 kg/cm² (abs.) was imparted by air to these pre-foamed particles, and they were heated with steam having 3.2 kg/cm² (G) in a mold to obtain a foamed article. The results are shown in Table 4.

TABLE 3

| | Pre-foamed particles after treatment | | | | Foamed article | | | |
|---|---|---|---|---|---|---|---|---|
| | Temperature of the hot air oven (°C.) | Expansion ratio | Number of cells per mm² | State of the particles | Expansion ratio | Dimensional accuracy (*1) | Melt adhesion (*2) | Overall evaluation |
| a | 1 | 47 | 29 | Surface lustrous; no melt-adhesion | 75 | | | |
| b | 3 | 39 | 33 | Surface lustrous; no melt-adhesion | 62 | | | |
| c | 5 | 31 | 38 | Surface lustrous; no melt-adhesion | 49 | | | |
| d | 7 | 22 | 48 | Surface lustrous; no melt-adhesion | 35 | | | |

(*1) and (*2): Same as the footnote to Table 1.

TABLE 4

| Example 4 | | Internal pressure of the particles (kg/cm²·abs.) | Pre-foamed particles after treatment | | | Foamed article | | | |
|---|---|---|---|---|---|---|---|---|---|
| | | | Expansion factor | Number of cells per mm² | State of the particles | Expansion ratio | Dimensional accuracy (*1) | Melt adhesion (*2) | Overall evaluation |
| A | a | 3.75 | 30 | 21 | Surface lustrous, no melt-adhesion | 48 | | | |
| | b | 4.25 | 34 | 19 | Surface lustrous, no melt-adhesion | 54 | | | |
| | c | 4.6 | 39 | 18 | Surface lustrous, | 62 | | | |

TABLE 4-continued

| Example 4 | | Internal pressure of the particles (kg/cm² abs.) | Pre-foamed particles after treatment | | | Foamed article | | | |
|---|---|---|---|---|---|---|---|---|---|
| | | | Expansion factor | Number of cells per mm² | State of the particles | Expansion ratio | Dimensional accuracy (*1) | Melt adhesion (*2) | Overall evaluation |
| B | d | 2.02 | 30 | 39 | Surface lustrous, no melt-adhesion | 48 | | | |
| | e | 3.05 | 44 | 30 | Surface lustrous, no melt-adhesion | 70 | | | |
| | f | 3.90 | 56 | 26 | Surface lustrous, no melt-adhesion | 89 | | | |
| C | g | 1.90 | 36 | 58 | Surface lustrous, no melt-adhesion | 57 | | | |
| | h | 2.60 | 48 | 50 | Surface lustrous, no melt-adhesion | 76 | | | |
| | i | 3.25 | 62 | 42 | Surface lustrous, no melt-adhesion | 98 | | | |

EXAMPLES 5 AND 6 AND COMPARATIVE EXAMPLE 3

Original pre-foamed particles of an ethylene-propylene random copolymer (melting point 145° C.) having each of the internal pressures shown in Table 5 and obtained by a conventional method were fed into a vessel, and with stirring, directly heated with steam having each of the pressures shown in Table 5. An internal pressure of 2.5 kg/cm² (abs.) was imparted by air to the resulting pre-foamed particles. Then, these pre-foamed particles were filled in a mold, and heated with steam at 3.2 kg/cm² (G) to obtain a foamed article. The dimensional accuracy and the melt adhesion of the foamed article were measured. The results are shown in Table 5.

TABLE 5

| | Original pre-foamed particles | | | | Pressure of steam | Pre-foamed particles after treatment | | Foamed article | | | |
|---|---|---|---|---|---|---|---|---|---|---|---|
| | Expansion ratio | Number of cells per mm² | $E^{\frac{1}{2}} \times n^{\frac{1}{2}}$ | Internal pressure (kg/cm² abs.) | | Number of cells per mm² | Expansion ratio | Expansion ratio | Dimensional accuracy (*1) | Melt adhesion (*2) | Overall evaluation |
| Example 5 | | | | | | | | | | | |
| a | 10 | 345 | 40 | 2.5 | 2.0 | 204 | 22 | 35 | | | |
| b | 19 | 56 | 20 | 2.1 | 2.5 | 33 | 42 | 67 | | | |
| c | 28 | 1 | 3 | 1.5 | 2.2 | 0.8 | 38 | 61 | | | |
| Comparative Example 3 | | | | | | | | | | | |
| a | 10 | 0.5 | 1.5 | 2.4 | 2.0 | 0.3 | 23 | 37 | X | X | |
| b | 28 | 390 | 60 | 1.2 | 2.2 | 330 | 36 | 55 | Δ | Δ | |
| c | 28 | 1000 | 96 | 1.4 | 2.2 | 1080 | 25 | 34 | X | X | |
| Example 6 | 19 | 56 | 20 | 1.0 | 2.5 | 48 | 24 | 38 | | | |

(*1) and (*2): Same as the footnote to Table 1.

What we claim is:

1. A process for producing pre-foamed particles of a polypropylene resin which comprises expanding original pre-foamed particles of a polypropylene resin, said original pre-foamed particles having the following relation $$2 < E^{\frac{1}{2}} \times n^{\frac{1}{2}} < 45$$

wherein E is the expansion ratio of the original pre-foamed particles, and n is the number of cells per mm² of the cross section of the original pre-foamed particles, by (1) including an inorganic gas, a volatile blowing agent, or a mixture of these into the original pre-foamed particles so that the internal pressure reaches 1.5 to 10 kg/cm² (abs), and expanding ability is imparted to the original pre-foamed particles and then heating them with a heated gas to a temperature of from the heat distortion temperature of the base resin of the pre-foamed particles, which is from 80° to 130° C., to a temperature 15° C. higher than the melting point of the base resin of the pre-foamed particles of (2) heating the original pre-foamed particles with steam to a temperature of from the heat distortion temperature of the base resin of the particles which is from 80° to 130° C. to a temperature 15° C. higher than the melting point of the base resin of the pre-foamed particles with or without imparting expanding ability thereto by including an inorganic gas, a volatile blowing agent, or a mixture of these into the original pre-foamed particles so that the internal pressure reaches 1.5 to 10 kg/cm$^2$ (abs), whereby pre-foamed particles having an expansion ratio higher than the original expansion ratio E are obtained.

2. The process of claim 1 wherein the polypropylene resin is a homopolymer of propylene, an ethylene-propylene random copolymer, and ethylene-propylene block copolymer, or a mixture of these.

3. The process of claim 1 wherein the gas is air, nitrogen, argon, helium, carbon dioxide, dichlorodifluoromethane, trichlorofluoromethane, dichlorotetrafluoroethane or a mixture of these.

4. The process of claim 3 wherein the gas is air.

5. The process of claim 1 wherein the operation 2 is carried out and the stream has a pressure of 0.5 to 3 kg cm$^2$ (G).

6. The process of claim 1 wherein the operation (1) or (2) is repeated at least twice.

7. The process of claim 5 which includes the step of imparting the expanding ability to the original pre-foamed particles.

8. The process of claim 5 wherein the time of heating the original pre-foamed particles with steam is not more than 1 minute.

9. The process of claim 1 wherein the operation (1) is carried out.

* * * * *

UNITED STATES PATENT AND TRADEMARK OFFICE
CERTIFICATE OF CORRECTION

PATENT NO. : 4,504,601
DATED : March 12, 1985
INVENTOR(S) : KUWABARA, ET AL.

It is certified that error appears in the above-identified patent and that said Letters Patent is hereby corrected as shown below:

Claim 5, line 1, delete "2" and insert -- (2) --, line 2, delete "stream" and insert -- steam --, delete "kg" and insert -- kg/ --.

Signed and Sealed this

Ninth Day of July 1985

[SEAL]

Attest:

DONALD J. QUIGG

Attesting Officer     Acting Commissioner of Patents and Trademarks